(12) United States Patent
Zhao et al.

(10) Patent No.: US 9,703,427 B2
(45) Date of Patent: Jul. 11, 2017

(54) CAPACITIVE TOUCH DISPLAY PANEL, DISPLAY DEVICE AND CONTROL DEVICE

(71) Applicant: BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN); Shengji Yang, Beijing (CN); Yingming Liu, Beijing (CN); Xiaoliang Ding, Beijing (CN); Hongjuan Liu, Beijing (CN); Tao Ren, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 155 days.

(21) Appl. No.: 14/090,186

(22) Filed: Nov. 26, 2013

(65) Prior Publication Data

US 2014/0176491 A1    Jun. 26, 2014

(30) Foreign Application Priority Data

Dec. 20, 2012    (CN) .......................... 2012 1 0559869

(51) Int. Cl.
G06F 3/044    (2006.01)
G09G 3/36    (2006.01)
G06F 3/041    (2006.01)

(52) U.S. Cl.
CPC ............ *G06F 3/044* (2013.01); *G06F 3/0412* (2013.01); *G06F 3/0416* (2013.01); *G09G 3/36* (2013.01); *G09G 3/3648* (2013.01)

(58) Field of Classification Search
CPC ...... G06F 3/044; G06F 3/0416; G06F 3/3648; G06F 2330/08; G06F 3/0412; G09G 3/36; G09G 3/3648
(Continued)

(56) References Cited

U.S. PATENT DOCUMENTS

2008/0018613 A1* 1/2008 Kim ...................... G06F 3/0412
345/173
2010/0328259 A1* 12/2010 Ishizaki ................. G06F 3/044
345/174
(Continued)

FOREIGN PATENT DOCUMENTS

CN    102749747 A    10/2012
CN    102768604 A    11/2012
(Continued)

OTHER PUBLICATIONS

First Chinese Office Action Appln. No. 201210559869.0; dated Apr. 1, 2015.
(Continued)

*Primary Examiner* — William Boddie
*Assistant Examiner* — Saifeldin Elnafia
(74) *Attorney, Agent, or Firm* — Ladas & Parry LLP (57) ABSTRACT

A capacitive touch display panel comprises an array substrate, a color filter substrate and a liquid crystal layer disposed between the array substrate and the color filter substrate; the array substrate includes a base substrate, a polarizer sheet, black matrixes (BMs) and a thin-film transistor (TFT) functional unit and is disposed on a light emitting side of the display panel; the color filter substrate is disposed on a light incident side of the display panel; the TFT functional unit includes gate lines, data lines, and TFTs; the BMs correspond to the TFTs; and projections of gate electrodes, source electrodes and drain electrodes of the TFTs all fall into the BMs in a direction vertical to the base substrate.

8 Claims, 4 Drawing Sheets

(58) Field of Classification Search
USPC .................. 345/173; 349/86, 96, 106, 141
See application file for complete search history.

(56) References Cited

U.S. PATENT DOCUMENTS

| | | | |
|---|---|---|---|
| 2011/0109568 A1* | 5/2011 | Wu .................. | G06F 3/0412 345/173 |
| 2011/0291977 A1 | 12/2011 | Moriwaki | |
| 2013/0083258 A1 | 4/2013 | Kawasaki et al. | |
| 2013/0300952 A1 | 11/2013 | Yeh et al. | |
| 2014/0085222 A1* | 3/2014 | Park .................. | G06F 3/044 345/173 |

FOREIGN PATENT DOCUMENTS

| | | |
|---|---|---|
| CN | 202976051 U | 6/2013 |
| WO | 2011052307 A1 | 8/2011 |

OTHER PUBLICATIONS

Second Chinese Office Action Appln. No. 201210559869.0; Dated Jul. 21, 2015.

* cited by examiner

CAPACITIVE TOUCH DISPLAY PANEL, DISPLAY DEVICE AND CONTROL DEVICE

TECHNICAL FILED

Embodiments of the present technical disclosure relate to a capacitive touch display panel, a display device, a control device and a control method.

BACKGROUND

With the rapid development of display technologies, touch screen panels have gradually become widespread in people's lives. Currently, the general structure of a touch screen panel comprises a layer of touch panel on the light emitting side of a display panel, and the touch panel and the display panel are bonded together. This configuration has the defects of high manufacturing costs, low light transmittance, thick module profile, and the like.

Figure 1:
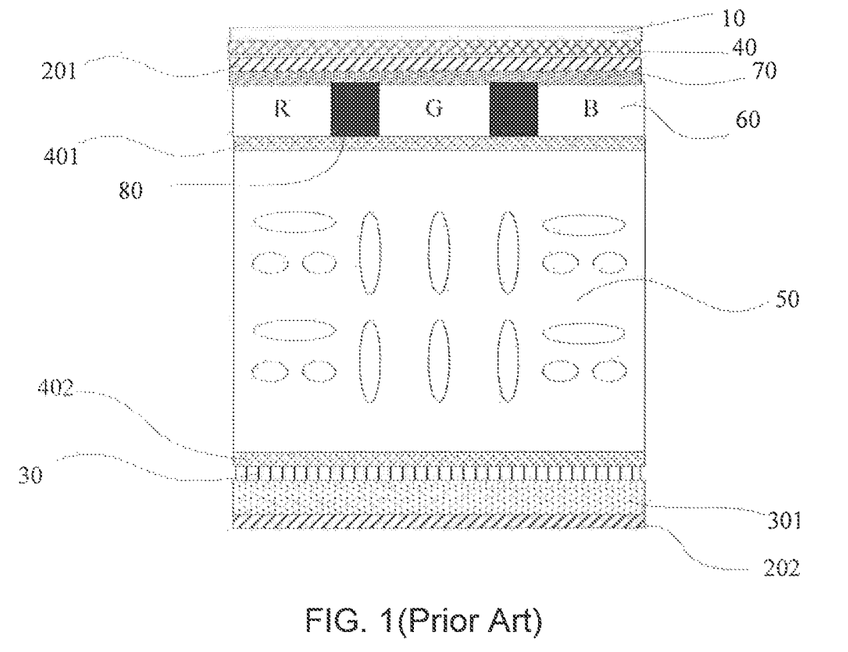
FIG. 1 is a schematic structural view of a traditional display with touch function.

As illustrated in FIG. 1, the traditional liquid crystal display (LCD) with touch function comprises (from top down): a protective layer 10, a touch panel 40, an upper polarizer sheet 201, a shield indium tin oxide (ITO) layer 70, a color filter layer 60, an upper alignment layer 401, a liquid crystal material layer 50, a lower alignment layer 402, an active array (thin-film transistor (TFT) functional unit) layer 30, a base substrate 301, and a lower polarizer sheet 202.

In the above structure, as the capacitive touch control function is achieved by attaching the touch panel on the upper polarizer, the cost is high. In addition, due to the addition of the bonding process, the yield is reduced. Moreover, as the thickness is large, the transmittance can be affected disadvantageous.

SUMMARY

An embodiment of the present technical disclosure provides a capacitive touch display panel, which comprises an array substrate, a color filter substrate and a liquid crystal layer disposed between the array substrate and the color filter substrate; the array substrate includes a base substrate, a polarizer sheet, black matrixes (BMs) and a thin-film transistor (TFT) functional unit and is disposed on a light emitting side of the display panel; the color filter substrate is disposed on a light incident side of the display panel; the TFT functional unit includes gate lines, data lines, and TFTs; the BMs correspond to the TFTs; and projections of gate electrodes, source electrodes and drain electrodes of the TFTs all fall into the BMs in a direction vertical to the base substrate.

Another embodiment of the present technical disclosure provides a display device, each touch drive unit comprising a plurality of pre-selected data lines, and each touch sensing unit comprising a plurality of pre-selected gate lines, the display device comprising the foregoing display panel and a control device for display and touch control of the display panel; the control device is configured to output display drive signals to all the gate lines and output display data signals to all the data lines and then conduct image display within a display time period of each frame, and output touch drive signals to the data lines of each touch drive unit and corresponding touch sensing signals to the gate lines of each touch sensing unit within a touch time period of each frame.

Further an embodiment of the present technical disclosure provides a control device for achieving the display and touch functions of the display panel, each touch drive unit comprising a plurality of pre-selected data lines, and each touch sensing unit comprising a plurality of pre-selected gate lines, the control device comprising: a display control unit configured to output display drive signals to all the gate lines and output display data signals to all the data lines and then conduct image display within a display time period of each frame; and a touch control unit configured to output touch drive signals to the data lines of each touch drive unit and corresponding touch sensing signals to the gate lines of each touch sensing unit within a touch time period of each frame.

Still further another embodiment of the present technical disclosure provides a control method for achieving the display and touch functions of the display panel, each touch drive unit comprising a plurality of pre-selected data lines, and each touch sensing unit comprising a plurality of pre-selected gate lines, the method comprising: outputting display drive signals to all the gate lines and the output of display data signals to all the data lines and hence achieving picture display within a display time period of each frame; and outputting touch drive signals to the data lines of each touch drive unit and corresponding touch sensing signals to the gate lines of each touch sensing unit within a touch time period of each frame.

Further scope of applicability of the present technical disclosure will become apparent from the detailed description given hereinafter. However, it should be understood that the detailed description and specific examples, while indicating preferred embodiments of the technical disclosure, are given by way of illustration only, since various changes and modifications within the spirit and scope of the technical disclosure will become apparent to those skilled in the art from the following detailed description.

BRIEF DESCRIPTION OF THE DRAWINGS

The present technical disclosure will become more fully understood from the detailed description given hereinafter and the accompanying drawings which are given by way of illustration only, and thus are not limitative of the present technical disclosure and wherein.

DETAILED DESCRIPTION

Embodiments of the present technical disclosure provide a capacitive touch display panel, a display device, a control device and a control method. The embodiments can achieve the display and touch functions of a display panel without additionally providing a touch panel, and hence simplify the structure of the capacitive touch display panel and improve the light transmittance.

An embodiment of the present technical disclosure provides a capacitive touch display panel, which comprises an array substrate, a color filter substrate and a liquid crystal layer disposed between the array substrate and the color filter substrate; the array substrate includes a base substrate, a polarizer sheet, black matrixes (BMs) and an active array (for instance, a TFT functional unit) and is disposed on the light emitting side of the display panel; and the color filter substrate is disposed on the light incident side of the display panel. That is to say, the backlight module used together with the liquid crystal panel is disposed on the same side of the display panel as the color filter substrate and may be a side-lit backlight module or a direct-lit backlight module.

One example of the active array is a TFT functional unit. The TFT functional unit includes gate lines, data lines, and TFTs; the gate lines and the data lines are intersected with each other to define pixel units arranged in a matrix; and each pixel unit includes a TFT acting as a switching element and a pixel electrode for controlling the arrangement of liquid crystals. If required, each pixel unit may also include a common electrode cooperating with the pixel electrode. For instance, a gate electrode of the TFT of each pixel unit is electrically connected or integrally formed with corresponding gate lines; a source electrode of the TFT of each pixel unit is electrically connected or integrally formed with corresponding data lines; and a drain electrode of the TFT of each pixel unit is electrically connected or integrally formed with the corresponding pixel electrode.

The BMs correspond to the TFTs, and projections of the gate electrodes, the source electrodes and the drain electrodes of the TFTs all fall into the BMs in a direction vertical to the base substrate.

For instance, the base substrate may be a glass substrate, a plastic substrate and the like.

For instance, the BMs are disposed between the base substrate and the TFT functional unit.

Or the array substrate may further comprise a protective layer disposed on the light emitting side of the array substrate, the polarizer sheet is disposed on the light emitting side of the array substrate, and the BMs are disposed between the protective layer and the polarizer sheet.

For instance, the protective layer may be a protective glass layer.

Or the polarizer sheet is disposed on the light emitting side of the array substrate, and the BMs are disposed between the polarizer sheet and the base substrate.

An embodiment of the present technical disclosure provides a display device, which comprises the foregoing display panel and a control device for achieving the display and touch functions of the display panel.

Each touch drive unit comprises a plurality of pre-selected data lines, and each touch sensing unit comprises a plurality of pre-selected gate lines, and in another word, the plurality of pre-selected data lines are grouped into one touch drive unit, and the plurality of pre-selected gate lines are grouped into one touch sensing unit. In the operating process of the control device, the control device is configured to output display drive signals to all the gate lines and output display data signals to all the data lines and then conduct image display within a display time period of each frame, and output touch drive signals to the data lines of each touch drive unit and corresponding touch sensing signals to the gate lines of each touch sensing unit within a touch time period of each frame.

For instance, based on the resolution and the size of a display panel, i gate lines are connected in parallel to form a touch sensing unit RX and m data lines are connected in parallel to form a drive unit TX, wherein i is an integral number greater than or equal to 1 and less than or equal to the total number of the gate lines, and m is an integral number greater than or equal to 1 and less than or equal to the total number of the data lines.

For instance, a predetermined number of data lines are disposed between any two adjacent touch drive units, and there is no signal on the data lines disposed between the adjacent touch drive units within a touch time period of each frame, i.e., in this time period these data lines are not driven; and a predetermined number of gate lines are disposed between any two adjacent touch sensing units, and there is no signal on the gate lines disposed between the adjacent touch sensing units, i.e., in this time period these gate lines are not driven.

For instance, n data lines are disposed between the two adjacent drive units (TX), and j gate lines are disposed between the two adjacent sensing units (RX), wherein both n and j are integral numbers greater than or equal to 2 and less than or equal to the total number of the gate lines.

Detailed description will be given below to the present technical disclosure with reference to the accompanying drawings and the preferred embodiments.

Figure 2:
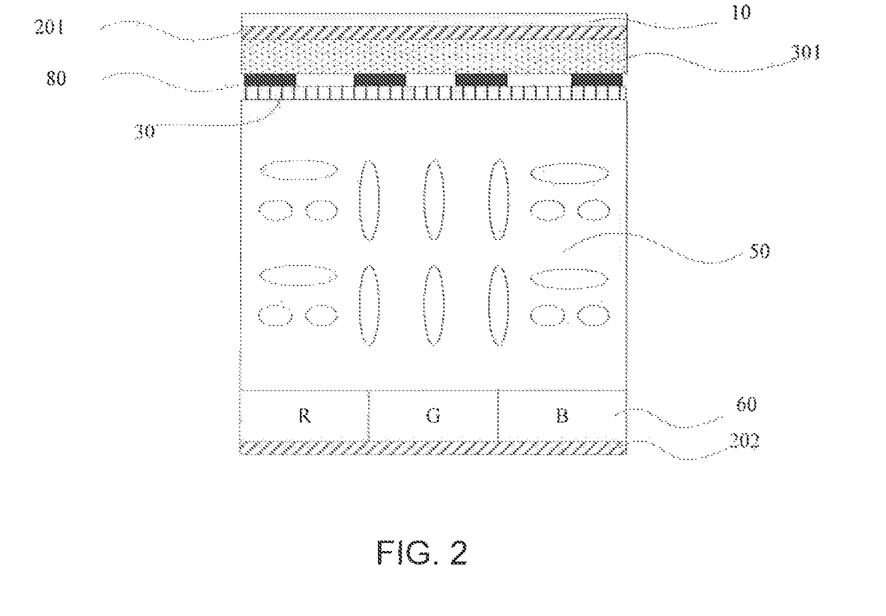
FIG. 2 is a schematic structural view of a display panel according to an embodiment of the present technical disclosure.

As illustrated in FIG. 2 which is a schematic diagram of a display panel according to an embodiment of the present technical disclosure, the display panel comprises (from top down): a protective layer 10, an upper polarizer sheet 201, BMs 80, a TFT functional unit 30, a liquid crystal material layer 50, a color filter substrate 60, and a lower polarizer sheet 202.

Figure 3:
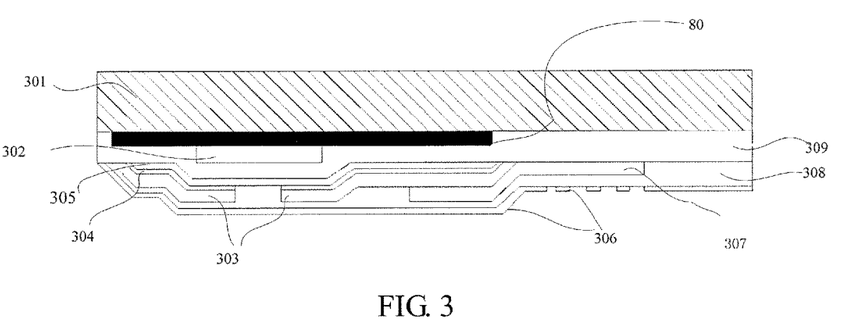
FIG. 3 is a schematic structural view of a TFT in the structure as illustrated in FIG. 2.

As illustrated in FIGS. 2 and 3, the array substrate includes a base substrate 301 and a TFT functional unit 30 on the base substrate 301. One example of the TFT functional unit 30 includes thin film transistors, each of which comprises a gate electrode 302, source/drain electrodes 303, an ohmic contact layer (N+a-Si layer) 304, and an amorphous silicon (a-Si layer) 305, a common electrode layer 306, pixel electrodes 307, an insulating layer (PVX layer) 308 and SiNx layer 309. The N+a-Si layer 304 and the a-Si layer 305 are combined to form an active layer; the gate electrode 302, the source/drain electrodes 303, the ohmic contact layer (N+a-Si) 304, the amorphous silicon layer (a-Si) 305, the insulating layer (PVX) 308 and the insulating layer (SiNx) 309 are combined to form a TFT; and the common electrode layer 306 is, for instance, made of a transparent conductive material such as indium zinc oxide (IZO) or indium tin oxide (ITO).

As illustrated in FIGS. 2 and 3, the TFT functional unit 30 is disposed on the liquid crystal material layer 50; the color filter substrate 60 is disposed under the liquid crystal material layer 50; and the BMs 80 are disposed between the base substrate 301 and the TFT functional unit 30. Therefore, projections of the gate electrodes 302 and the source/drain electrodes 303 in the direction vertical to the base substrate 301 all fall into the BMs 80.

In the embodiment of the present technical disclosure, the array substrate is disposed on the light emitting side of the liquid crystal panel, the color filter is disposed on the light incident side of the liquid crystal pane, and no BM is formed on the color filter substrate again. Therefore, light from the backlight module can completely pass through the color filter substrate (e.g., a glass substrate). In addition, as the BMs are manufactured on the array substrate, the light reflection of a metal layer in the TFT functional unit can be also avoided.

Moreover, as illustrated in FIG. 3, the common electrode layer 306 on the PVX layer is an integral electrode for an entire TFT region and may completely cover the TFT, and the common electrode layer 306 may be in comb-like configuration in a pixel region or have a series of openings in parallel to each other. As for the whole display panel, the common electrode layer can shield the electric fields from the data lines to the pixel electrodes and the electric fields from the gate lines to the pixel electrodes. As the data lines acting as the touch drive units and gate lines acting as the touch sensing units are disposed between the common electrode layer and the base substrate, the electric fields between the touch drive units and the touch sensing units cannot be shielded by the common electrode layer 306, and hence the touch function can be realized normally.

The display panel according to the embodiment of the present technical disclosure not only can achieve the display function but also can achieve the touch function. The display device according to the embodiment of the present technical disclosure comprises the display panel and a control device, and the control device is configured to output display drive signals to all the gate lines and output display data signals to all the data lines and then conduct image display within a display time period of each frame, and output touch drive signals to the data lines of each touch drive unit and corresponding touch sensing signals to the gate lines of each touch sensing unit within a touch time period of each frame. As mentioned above, each touch drive unit comprises a plurality of pre-selected data lines, and each touch sensing unit comprises a plurality of pre-selected gate lines.

Figure 4:
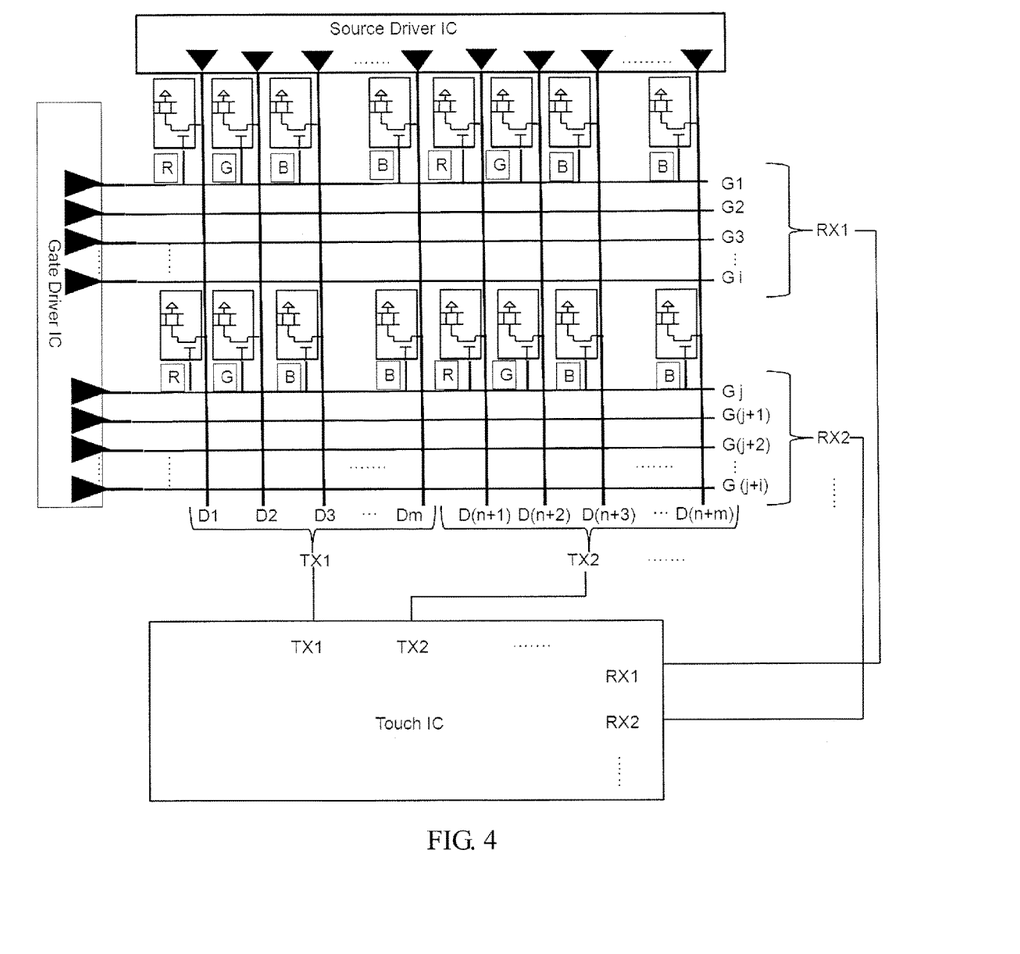
FIG. 4 is a schematic diagram of touch drive units and touch sensing units, for achieving the touch function of the display panel according to an embodiment of the present technical disclosure.

More specifically, as illustrated in FIG. 4, i gate lines are connected in parallel to form each of the touch sensing units RX1, RX2, and the like respectively and m data lines are connected in parallel to form each of the touch drive units TX1, TX2 and the like respectively within the touch time periods. As a predetermined number of data lines are disposed between two adjacent touch drive units and a predetermined number of gate lines are disposed between two adjacent touch sensing units, the electric fields between the touch drive units and the touch sensing units can be uniformly distributed. For instance, three (3) data lines may be disposed between two adjacent touch drive units, and four (4) gate lines may be disposed between two adjacent touch sensing units; or five (5) data lines may be disposed between the adjacent touch drive units, and three (3) gate lines may be disposed between the adjacent touch sensing units. However, the embodiment of the present technical disclosure is not limited to the above-described specific examples, and other designs may be made by those skilled in the art according to requirements.

The method for achieving the display and touch functions of the display panel, according to the embodiment of the present technical disclosure, will be described below with reference to the accompanying drawings.

The control method for achieving the display and touch functions of the display panel, according to an embodiment of the present technical disclosure, is as described below. As illustrated in FIG. 4, in the control method, display drive signals are output to all the gate lines and display data signals are output to all the data lines, and hence image display can be conducted (e.g., static or dynamic images), within a display time period of each frame; and touch drive signals are output to the data lines of each touch drive unit and corresponding touch sensing signals are output to gate lines of each touch sensing unit within a touch time period of each frame; also each touch drive unit comprises a plurality of pre-selected data lines, and each touch sensing unit comprises a plurality of pre-selected gate lines.

For instance, a predetermined number of data lines are disposed between any two adjacent touch drive units, and there is no signal on the data lines disposed between the adjacent touch drive units within the touch time period of each frame; and a predetermined number of gate lines are disposed between any two adjacent touch sensing units, and there is no signal on the gate lines disposed between the adjacent touch sensing units within the touch time period of each frame.

Figure 5:
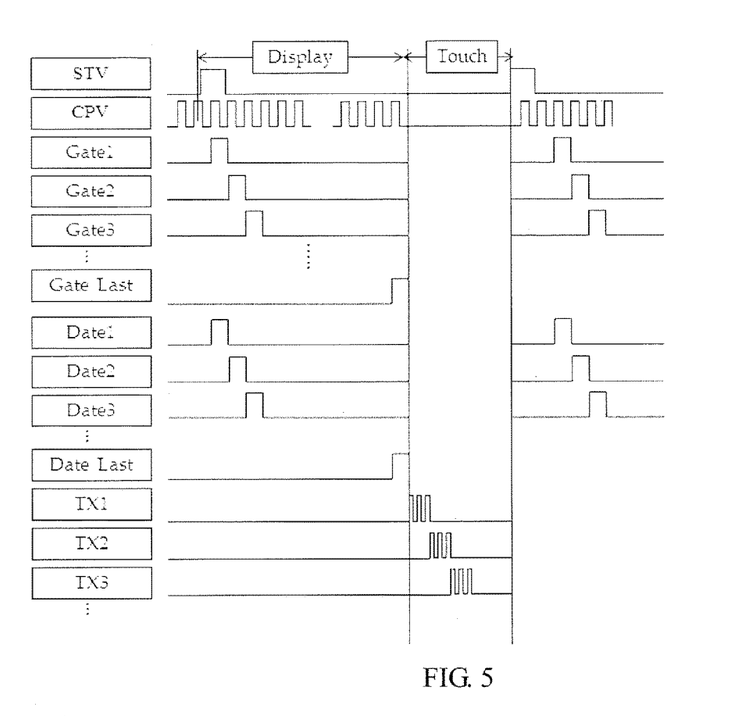
FIG. 5 is a timing chart of various signals for achieving the display and touch functions of the display panel according to an embodiment of the present technical disclosure.

For instance, as illustrated in FIG. 5 which is a timing chart of various signals, STV (Start Vertical) refers to a frame start signal; CPV (Clock Pulse Vertical) refers to a control start signal; Gate1, Gate2 and so on refer to gate signals for the gate lines respectively; Data1, Data2 and so on refer to data signals for the data lines respectively; TX1, TX2 and so on refer to touch drive signals for the touch drive units respectively; and the time of each frame is divided into a display time period and a touch time period. When the STV signal for each frame arrives, the display time period begins; corresponding gate signals and data signals are inputted into all the gate lines and the data lines respectively within the display time period in a way (e.g., progressive scanning), so that the whole frame can be displayed on the screen; and after the picture display procedure ends, all the gate lines are turned off. The gate lines are progressively scanned, and a gate line row is turned off after it is scanned. All the data lines do not output signals, for instance, a dividing line between the Display and the Touch in the figure.

Subsequently, the touch time period of each frame begins. As illustrated in FIG. 4, different touch drive signals are outputted to each touch drive unit formed by a plurality of data lines, and the data lines in a same touch drive unit are connected with a same drive signal source, so that touch drive units TX1, TX2, TX3 and so on are subjected to drive scanning; and corresponding touch sensing signals are inputted into each touch sensing unit formed by a plurality of gate lines, and the gate lines in a same touch sensing unit are connected with a same touch sensing signal source, so that the sensing of external touch can be realized.

The display process of each frame includes the display time period and the touch time period, that is to say, when the image signal of the next frame, namely the STV, arrives, a new display time period restarts. Therefore, the display function and the touch function of the display panel can be achieved in the time-sharing driving method.

An embodiment of the present technical disclosure provides a control device for achieving the display and touch functions of the display panel, which comprises: a display control unit and a touch control unit. The display control unit is configured to output display drive signals to all the gate lines and output display data signals to all the data lines and then conduct image display within a display time period of each frame for realizing image display; the display control unit, for instance, includes a Source Driver IC and a Gate Driver IC as illustrated in FIG. 4, or the two IC chips may be combined into a same control chip.

The touch control unit is configured to output touch drive signals to the data lines of each touch drive unit and corresponding touch sensing signals to the gate lines of each touch sensing unit within a touch time period of each frame for realizing touch control; each touch drive unit comprises a plurality of pre-selected data lines, and each touch sensing unit comprises a plurality of pre-selected gate lines; and the touch control unit is, for instance, a Touch IC as illustrated in FIG. 4.

For instance, a predetermined number of data lines are disposed between any two adjacent touch drive units, and there is no signal on the data lines disposed between the adjacent touch drive units within the touch time period of each frame; and a predetermined number of gate lines are disposed between any two adjacent touch sensing units, and there is no signal on the gate lines disposed between the adjacent touch sensing units within the touch time period of each frame.

Figure 6:
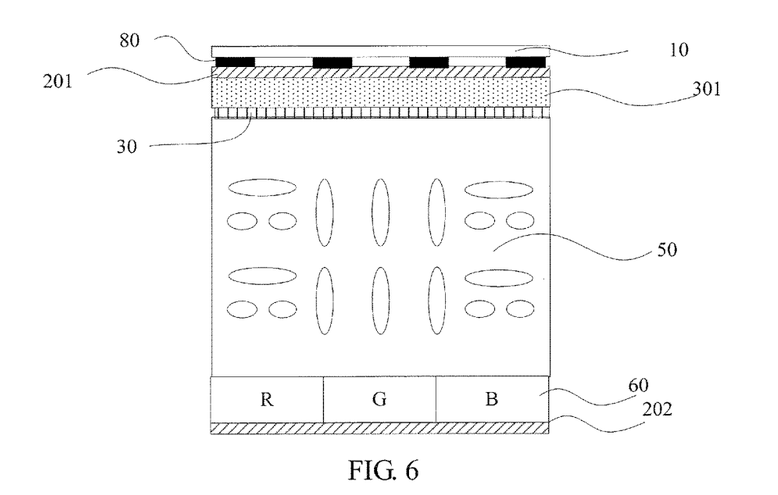
FIG. 6 is a schematic structural view of another display panel according to an embodiment of the present technical disclosure.

It should be noted that the structure of a display panel provided by another embodiment of the present technical disclosure may also adopt the following modification. As illustrated in FIG. 6, in the structure of the display panel according to the embodiment, the position of the BMs 80 is changed compared with FIG. 2. The BMs 80 are disposed between protective glass 10 and an upper polarizer sheet 201, and may also have the function of preventing metals on a TFT substrate from reflecting light incident from the outside.

Moreover, the BMs may also be disposed between the upper polarizer sheet 201 and a base substrate 301.

The technical proposals according to the embodiments of the present technical disclosure are also applicable to TN mode LCDs. When applied to a TN mode LCD, the array substrate according to the embodiment of the present technical disclosure does not include a common electrode layer for the pixel units; the other parts are basically the same as those of the present technical disclosure; and the control principle is also the same. Therefore, no further description will be given herein.

In summary, the embodiments of the present technical disclosure provide a capacitive touch display panel, a display device, a control device and a control method, which achieve the display and touch functions with the following arrangements: the array substrate is disposed on the liquid crystal layer; the color filter substrate is disposed under the liquid crystal layer; a portion of the data lines of the array substrate are grouped to act as capacitive touch drive lines; a portion of the gate lines of the array substrate are grouped to act as capacitive touch sensing lines; and the signals applied to the gate lines and the data lines are controlled in a time-sharing driving way, namely, the signal lines are controlled in the display time period and the touch time period of each frame in operation. Moreover, as the display and touch functions of the display panel can be achieved without the additionally arranged touch panel, the structure of the capacitive touch display panel can be simplified and the light transmittance can be improved.

It should be understood by those skilled in the art that the embodiments of the present technical disclosure may be implemented in the form of method, system or computer program product. Therefore, the present technical disclosure may be implemented completely in a hardware means or a software means, or in combination of software and hardware. Moreover, the present technical disclosure may be implemented in a computer program product applied to one or more computer-usable storage media (including, but not limited to, disc memory, optical memory and the like) containing computer-usable program codes.

The embodiment of the technical disclosure being thus described, it will be obvious that the same may be varied in many ways. Such variations are not to be regarded as a departure from the spirit and scope of the technical disclosure, and all such modifications as would be obvious to those skilled in the art are intended to be included within the scope of the following claims.

What is claimed is:

1. A capacitive touch display panel, comprising an array substrate, a color filter substrate and a liquid crystal layer disposed between the array substrate and the color filter substrate, wherein
   the array substrate includes a base substrate, a polarizer sheet, black matrixes (BMs) and a thin-film transistor (TFT) functional unit;
   the array substrate is disposed on a light emitting side of the display panel, and the color filter substrate is disposed on a light incident side of the display panel;
   the TFT functional unit includes a touch sensing unit comprising a plurality of pre-selected gate lines, a touch drive unit comprising a plurality of pre-selected data lines, and TFTs;
   the BMs correspond to the TFTs; and
   projections of gate electrodes, source electrodes and drain electrodes of the TFTs all fall into the BMs in a direction vertical to the base substrate,
   wherein, in operation, display drive signals are output to all the gate lines and output display data signals to all the data lines and then image display is conducted within a display time period of each frame, and
   touch drive signals are output to the data lines of the touch drive unit and touch sensing signals corresponding to the touch drive signals are output to the gate lines of the touch sensing unit within a touch time period of each frame,
   the TFT functional unit further comprises a electrode layer and a pixel electrode, the TFT comprises an insulating layer PVX, the common electrode layer is located on the insulation layer PVX, the insulating layer PVX is formed between the array substrate and the common electrode layer and the common electrode layer is an integral electrode for an entire TFT region and is in comb-like configuration in a pixel region, and the data lines and gate lines are disposed between the common electrode layer and the base substrate.

2. The display panel according to claim 1, wherein the BMs are disposed between the base substrate and the TFT functional unit.

3. The display panel according to claim 1, further comprising a protective layer disposed on the light emitting side of the array substrate; the polarizer sheet is disposed on the light emitting side of the array substrate; and the BMs are disposed between the protective layer and the polarizer sheet.

4. The display panel according to claim 1, wherein the polarizer sheet is disposed on the light emitting side of the array substrate; and the BMs are disposed between the polarizer sheet and the base substrate.

5. A display device, comprising the display panel according to claim 1 and a control device for display and touch control of the display panel,
   wherein the control device is configured to:
   output display drive signals to all the gate lines and output display data signals to all the data lines and then conduct image display within a display time period of each frame, and
   output touch drive signals to the data lines of each touch drive unit and corresponding touch sensing signals to the gate lines of each touch sensing unit within a touch time period of each frame.

6. The display device according to claim 5, wherein a predetermined number of data lines are disposed between any two adjacent touch drive units, and there is no signal on the data lines disposed between the adjacent touch drive units within the touch time period of each frame; and a predetermined number of gate lines are disposed between any two adjacent touch sensing units, and there is no signal on the gate lines disposed between the adjacent touch sensing units within the touch time period of each frame.

7. A control device for display and touch control of the display panel according to claim 1, the control device comprising:
   a display control unit configured to output display drive signals to all the gate lines and output display data signals to all the data lines and then conduct image display, within a display time period of each frame; and
   a touch control unit configured to output touch drive signals to the data lines of each touch drive unit and corresponding touch sensing signals to the gate lines of each touch sensing unit within a touch time period of each frame.

8. The control device according to claim 7, wherein a predetermined number of data lines are disposed between any two adjacent touch drive units, and there is no signal on the data lines disposed between the adjacent touch drive units within the touch time period of each frame; and
   a predetermined number of gate lines are disposed between any two adjacent touch sensing units, and there is no signal on the gate lines disposed between the adjacent touch sensing units within the touch time period of each frame.

* * * * *